Aug. 22, 1967 R. E. BERRYMAN 3,337,106

FLUID CAPSTAN FOR TAPE DRIVE WITH PNEUMATIC PRESSURE ATTRACTION OR REPULSION

Filed March 18, 1965 2 Sheets-Sheet 1

INVENTOR
RICHARD E. BERRYMAN

BY [signature]
AGENT

United States Patent Office 3,337,106
Patented Aug. 22, 1967

3,337,106
FLUID CAPSTAN FOR TAPE DRIVE WITH PNEUMATIC PRESSURE ATTRACTION OR REPULSION

Richard E. Berryman, King of Prussia, Pa., assignor to Sperry Rand Corporation, New York, N.Y., a corporation of Delaware Filed Mar. 18, 1965, Ser. No. 440,823
7 Claims. (Cl. 226—95)

ABSTRACT OF THE DISCLOSURE

A tape capstan is provided which comprises a cylindrical spool rotatably mounted on a fixed hub. The spool contains a fluid porous surface which overruns a peripheral plenum chamber formed in the surface of the fixed hub. A poppet valve is removably inserted in the fixed hub and may be actuated to selectively connect either a vacuum or a positive pressure fluid source to the plenum. The valve is separated from the plenum by a thin wall in the hub which permits rapid reversals of either a vacuum or a pressure to the plenum whereby tape may be pulled down into engagement or blown out of engagement with the spool. The valve and capstan may be quickly and easily removed for ease of replacement.

The invention hereinafter described and claimed has to do with improved means for driving strip or web material, such as magnetic tape. More particularly the invention relates to a fluid operated capstan means providing for quick starting and stopping of the tape.

The use of fluid operated capstans is well known in magnetic tape processors. Normally, such processors have employed pairs of oppositely rotating capstans alternately and oppositely subjected to vacuum and pressure whereby the tape movement can quickly be reversed. Vacuum in one capstan effects movement of the tape in the direction of rotation of that capstan. At the same time pressure in the oppositely rotating capstan blows the tape out of engagement therewith and provides a fluid bearing for the tape as it passes over that capstan. To reverse the direction of tape flow the suction and pressure phases of the two capstans are reversed. The transition from the pressure phase to the vacuum phase should be effected as rapidly as possible.

When it is realized that fractions of milliseconds are important considerations in the operation of modern computers, it will be understood that any decrease in the time between vacuum and pressure phases of the capstans will result in an advantageous gain in computer use time.

It is, therefore, an important object of the present invention to provide improved fluid capstan tape drive means which substantially decreases the time loss previously experienced in the transition from the pressure to the vacuum phase, or vice versa.

Computer "down-time," i.e., when a computer is out of operation by reason of equipment failure, is another important consideration in the design of computer equipment. Heretofore, defective fluid operated capstans have presented rather difficult and time consuming repair operations.

Another object of the present invention, therefore, is to provide a fluid operated tape drive capstan wherein "down-time" resulting from defective operation is reduced to a minimum.

A further object of the invention is to provide a fluid operated tape drive capstan that fails safe without damage to the tape.

Still another object of the invention is to provide an improved fluid control valve particularly adapted for use in fluid controlled tape drive mechanisms and which is characterized by its high ratio of force to mass whereby large acceleration can immediately be effected for a valve movement of short throw and duration.

In accordance with the above objects and first briefly described, a capstan in accordance with the present invention comprises a cylindrical spool rotatably mounted on a fixed hub and having a fluid porous drive surface arranged about its periphery and adapted to overrun a plenum chamber formed between the spool and a cavity in the periphery of the fixed hub and traversing the area of tape contact with the spool. An improved moving or voice coil actuated poppet valve is positioned within the fixed hub for connecting the plenum chamber selectively with suitable sources of vacuum and pressure. The valve is separated from the plenum chamber only by a thin wall, thus providing for rapid reversals of the plenum chamber to suction or pressure when required. The valve is mounted for rapid and easy removal from the capstan as a whole, thus to reduce down-time in the event of valve failure. Likewise, the whole capstan may be easily and quickly removed for replacement, in the event of capstan failure.

Figure 1:
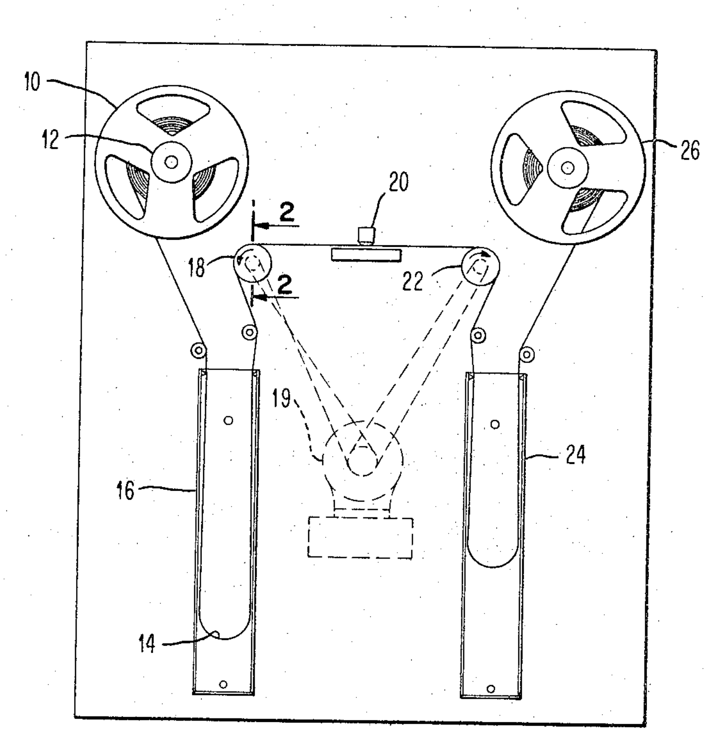
FIGURE 1 is a somewhat diagrammatic view of a magnetic tape drive or servo unit incorporating capstans in accordance with the present invention.

The general operation of tape drives is well known in the art and no detailed description is needed here for a full understanding of the present invention. By way of example, however, such a tape drive might be as shown in FIGURE 1. In this figure, a tape supply reel 10 is mounted on a reel drive motor shaft 12 for feeding a loop of tape 14 into a vacuum column 16 wherein suitable means responsive to the length of the loop, controls the reel drive motor (not shown) to keep the loop length substantially constant. The tape then feeds over the fluid capstan 18 which is being constantly rotated in the rewind or counterclockwise direction, as by motor 19. From capstan 18 is passes under and in contact with a read-write head 20, thence over the fluid drive capstan 22 which is constantly rotating in the forwarding or clockwise direction. From capstan 22 the tape flows downwardly into a second vacuum column 24 from which it loops back to be wound upon the takeup reel 26, as controlled by the loop length in column 24.

In accordance with well known fluid tape drive techniques, and still with reference to FIGURE 1, when vacuum is applied to capstan 22 the tape 14 is drawn into engagement therewith to drive it in the forward direction (to the right, as shown). Simultaneously pressure is applied to capstan 18 to press the tape away from driving contact with the capstan and support it upon a fluid bearing. To reverse the tape movement the suction and pressure phases are reversed and the tape is attracted into driving engagement with capstan 18 while being diverted from capstan 22 to ride on a fluid bearing.

Figure 2:
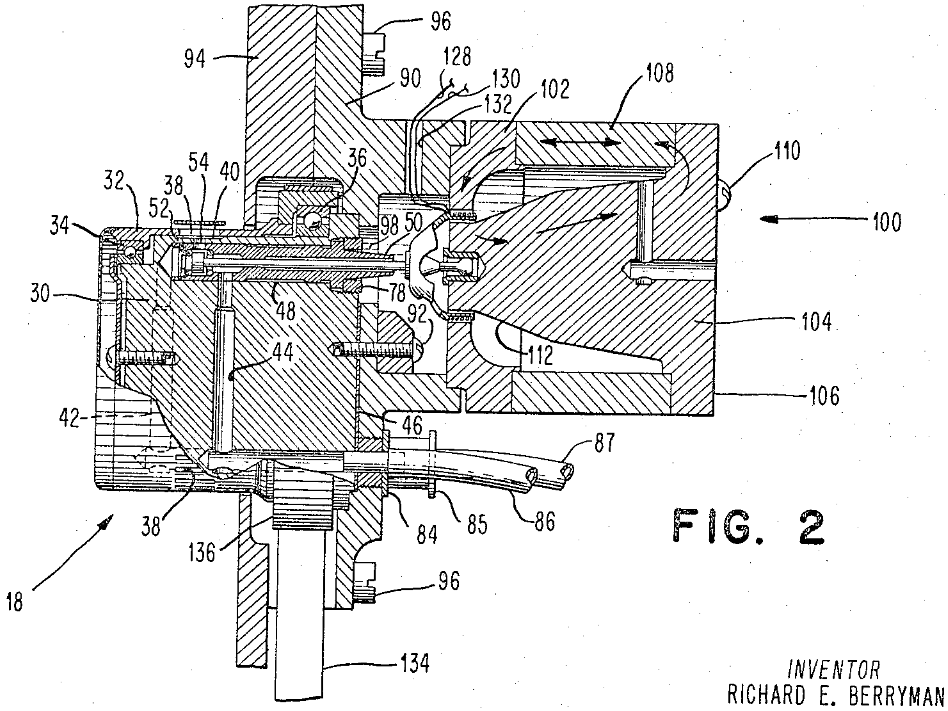
FIGURE 2 is a sectional view taken along the line 2—2 of FIGURE 1.

With reference now to FIGURE 2, it is seen that the capstan comprises a fixed hub element 30 having a cylindrical or cup-like spool 32 rotatably mounted thereon, as by fore and aft roller bearings 34 and 36 respectively. The spool 32 is provided with a fluid porous surface consisting, in this preferred embodiment, of a circular column of slotted apertures 38 arranged about its periphery to override a cavity 40 formed in and extending around the periphery of hub 30 a distance slightly less than the peripheral contact of the tape with the spool. Cavity 40 cooperates with the overriding spool 32 to form a plenum chamber for distributing the fluid pressure through the area of tape contact with the capstan.

A series of galleries or air passages 42 and 44 formed in hub 30 extend from its back surface 46 to the inner end of an axially extending bore 48 in which a poppet valve 50 is positioned. It will be noted that the bore 48 is separated from the plenum chamber 40 only by a thin wall 52 and in open communication therewith through a small aperture 54.

Figure 3:
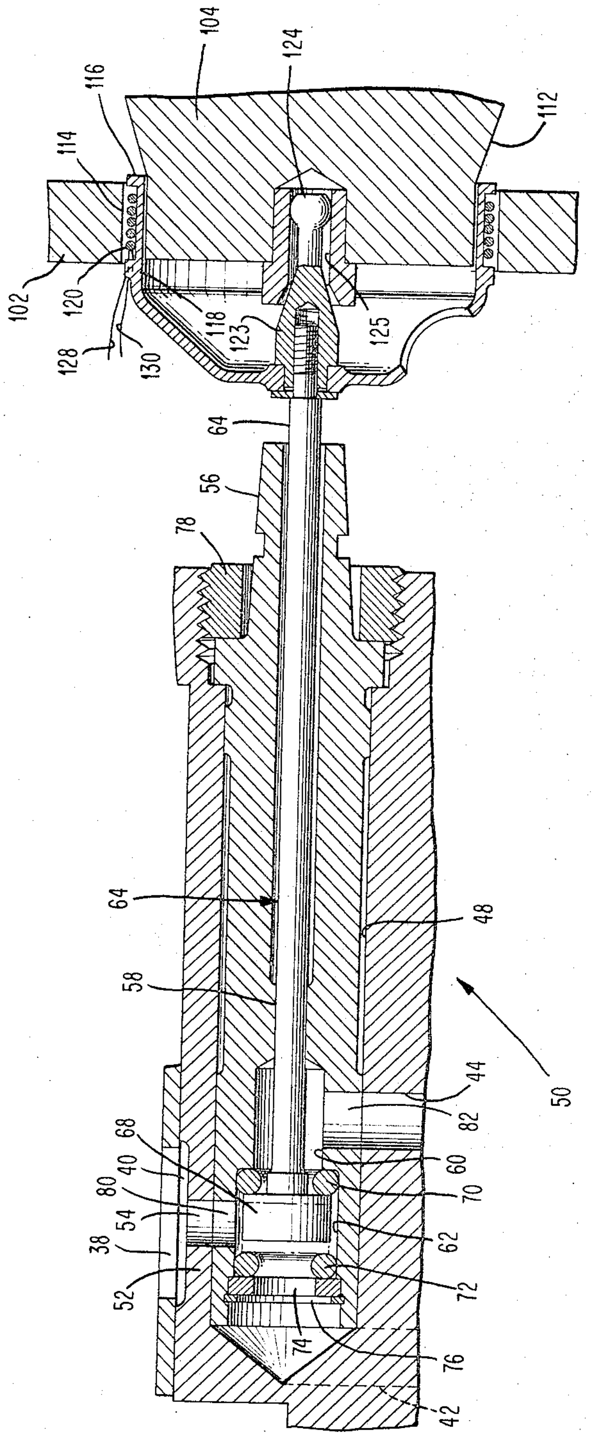
FIGURE 3 is an enlarged sectional view of the valve structure.

In particular accordance with the invention the poppet valve 50 provides the means for quickly connecting the aperture 54—and thus the plenum chamber 40—selectively with passageway 42 or 44. The valve as seen more clearly in FIGURE 3, comprises a cylinder 56 closely fitted into bore 48. The cylinder 56 is provided with axially aligned bores 58, 60 and 62 of increasingly larger diameter. Bore 58 provides a sliding bearing surface for supporting the inner end of the slender stem 64 to which is attached on its inner end a valve head 68 positioned in the chamber 62, selectively to seat against resilient O-ring 70 or 72 positioned at opposite ends of the chamber. A washer 74 secured in the open outer end of the cylinder 56, as by a C-ring 76, provides a seat for O-ring 72. The sleeve is secured in bore 48 as by the ring-nut 78 threaded into the outer end of bore 48.

It will be seen that when valve head 68 is against O-ring 70, as shown, suction passageway 42 is in open communication with the plenum chamber 40 by way of the open inner end of cylinder 56 and an aperture 80 extending through the cylinder intermediate the O-rings 70 and 72 and in registry with the aperture 54 communicating with the plenum chamber 40. When the valve head 68 is moved to the left against O-ring 72, as shown in phantom, pressure passageway 44 is in communication with the plenum chamber through the aperture 82 in the lower part of the cylinder, the bore 60, through O-ring 70, chamber 62, and apertures 80 and 54.

By reason of the close proximity of valve chamber 62 with plenum chamber 40—through the thin wall 52—response of the tape passing over the capstan will be almost simultaneous with the operation of the valve to either of its positions against O-ring 70 or 72.

With reference again to FIGURE 2, it is seen that hub 30 is secured to an adapter plate 90, as by screws 92, while the plate itself is secured to a front or face plate 94, as by screws 96. Screwed into threaded apertures in plate 90 in registry with the outer ends of passageways 42 and 44 are fluid fittings 84 and 85 for connection therewith of hoses 86 and 87 providing the means for connecting the passageways to suitable sources of vacuum and pressure, not shown, but in accordance with well known practice.

Plate 90 is provided with an aperture 98 providing easy access to the ring-nut 78 whereby the valve may easily be inserted into or removed from the hub 30.

Actuation of the valve is by means of a permanent magnet and voice-coil assembly 100. Use of the voice coil for valve plunger 64 affords the above mentioned high ratio of force to mass. The combined mass or weight of the valve plunger and coil is extremely low relative to the large force induced upon energization of the voice coil resulting in rapid acceleration of the coil assembly. While the stroke of the valve is extremely short, the rapid acceleration and the close coupling of the valve and plenum chamber, all combine to define a phase shift time (vacuum to pressure and vice versa) of exceedingly short duration, by way of example 2.25 milliseconds.

The permanent magnet assembly comprises an outer pole-piece 102, an inner pole-piece 104 having a base flange 106, and a cylindrical permanent magnet 108. The magnet interconnects the pole-piece 102 with the base flange 106 of the pole-piece 104, and the whole assembly is held together and secured to plate 90 as by screws 110, only one of which is shown. The pole-pieces 102 and 104 are formed of magnetizable material, such as iron.

The nose portion 112 of pole-piece 104 is of reduced diameter and coincides in length with the inner face 114 of ring 102 to provide an air gap 116 for receiving the voice-coil assembly 118 upon which the copper coil 120 is wrapped. The voice-coil is secured to the outer end of the valve stem 64 by the nut 123 which has an extension terminating in a knob 124 pivoting in a bearing 125 press-fitted into a bore in the face of inner pole-piece 104. The knob 124 and bore 125 are in alignment with bore 58 in valve sleeve 56 to support valve stem 64 for its reciprocatory movements in response to direct current passing through the coil 120. Leads 128 and 130 extending through an aperture 132 in plate 90 provide the means for connecting the coil to a suitable source of current. If desired, two such coils, one for each current direction, may be wound on the voice-coil assembly to facilitate rapid pulse reversals, and hereinafter the "coil" may be considered to be of either variety.

Movement of the coil assembly is effected by the interaction of the permanent magnet field from magnet 108 as indicated by the arrows, and the flow of direct current through the coil 120. The direction of the current through the coil determines the direction of movement of the valve head 68.

It will be observed that a holding force is not necessary when the valve head is seated against the O-ring 72 as the force of fluid pressure from passageway 44 will hold it in this position.

It will also be understood that should the valve structure become defective, it may readily and easily be removed by the mere removal of screws 110, and ring-nut 78 and withdrawing the valve from bore 48. Replacing the valve is easily effected by reversing this procedure. If it becomes necessary to remove the whole capstan this is easily and quickly accomplished simply by removing screws 96.

The capstan sleeve 32 is rotated on its bearing by means by the belt drive 134 threaded over its periphery 136 and the drive shaft of the motor 19, see FIGURE 1. If desired, each capstan may be driven by its own motor.

The embodiments of the invention in which an exclusive property or privilege is claimed are defined as follows:

1. A fluid capstan for driving tape, comprising:
(A) a fixed hub having
 (a) an elongated cavity extending partially about its periphery,
 (b) an axially extending bore partially underlying said cavity and separated therefrom only by a thin wall, and in communication therewith by an aperture through said thin wall, and
 (c) suction and pressure passageways extending through said hub with their outer ends arranged for connection to suitable sources of suction and pressure respectively and their inner ends terminating in closely spaced relation with each other in open communication with the inner end of said bore;
(B) a cylindrical spool rotatably mounted over said hub, said spool having a fluid porous area extending around its periphery to provide an operating surface for driving said tape, said fluid porous surface cooperating with said cavity to form a plenum chamber extending partially around said capstan;
(C) a poppet valve removably positioned in said bore and comprising, a cylinder having a chamber underlying said plenum chamber with apertures through said cylinder registering with said suction and pressure passageways and said thin wall aperture, a valve element in said cylinder chamber movable between terminal positions wherein said passageways selectively may be in open communication wtih said thin wall aperture thus to provide either suction or pressure to said plenum chamber either to draw said tape in operative relation with the operating surface of said spool, or to divert it away from said surface supported on a fluid bearing; and (D) means for so actuating said valve element.

2. A tape drive capstan according to claim 1 wherein means are provided for rotating said spool.

3. A fluid capstan for driving tape, comprising:

(A) a fixed hub having
  (a) an elongated cavity extending partially about its periphery,
  (b) an axially extending bore partially underlying said cavity and separated therefrom only by a thin wall, and in communication therewith by an aperture through said thin wall, and
  (c) suction and pressure passageways extending through said hub with their outer ends arranged for connection to suitable sources of suction and pressure respectively and their inner ends terminating in closely spaced relation with each other in open communication with the inner end of said bore;

(B) a cylindrical spool rotatably mounted over said hub, said spool having a fluid porous area extending around its periphery to provide an operating surface for driving said tape, said fluid porous surface cooperating with said cavity to form a plenum chamber extending partially around said capstan;

(C) a poppet valve removably positioned in said bore and comprising, a cylinder having a chamber underlying said plenum chamber with apertures through said cylinder registering with said suction and pressure passageways and said thin wall aperture, a valve element in said cylinder chamber movable between terminal positions wherein said passageways selectively may be in open communication with said thin wall aperture thus to provide either suction or pressure to said plenum chamber either to draw said tape in operative relation with the operating surface of said spool, or to divert it away from said surface supported on a fluid bearing; and (D) electrically responsive means for so actuating said valve element.

4. A capstan according to claim 3 wherein said electrically responsive valve element operating means comprises:

(A) a voice coil; and (B) interconnecting means extending through said cylinder for connecting said valve element with said voice coil.

5. A tape drive capstan according to claim 4 and further including:

(A) an adapter plate on one side of which said hub is removably secured and on the other side of which said voice coil is removably secured; and (B) said plate having an aperture through which said interconnecting means extends into said cylinder.

6. A tape drive capstan according to claim 4 wherein said voice coil comprises:

(A) means forming a permanent magnetic field;

(B) a voice coil;

(C) means movably supporting said voice coil in said magnetic field;

(D) means for connecting said coil to a source of direct electrical current whereby said current may flow in either direction through said coil for interaction with said magnetic field to effect movement of said coil selectively in opposite directions; and (E) means connecting said interconnecting means to said coil supporting means whereby said valve element may be moved between its terminal positions.

7. A fluid tape drive capstan in accordance with claim 4, and further including:

(A) resilient shock absorbent members in said chamber against which said valve element seats at said terminal positions.

References Cited

UNITED STATES PATENTS

| | | | |
|---|---|---|---|
| 3,001,549 | 9/1961 | Nelson et al. | 137—625.27 |
| 3,019,884 | 2/1962 | Bartelt | 226—95 X |
| 3,043,335 | 7/1962 | Hunt | 137—625.5 X |
| 3,118,582 | 1/1964 | Rapoza | 226—95 |
| 3,246,819 | 4/1966 | Reader et al. | 226—95 |
| 3,260,504 | 7/1966 | Mojonnier et al. | 137—625.5 X |

SAMUEL F. COLEMAN, *Primary Examiner.*